US012647523B2

(12) United States Patent
Kamoi

(10) Patent No.: US 12,647,523 B2
(45) Date of Patent: Jun. 2, 2026

(54) IMAGE READING APPARATUS, NON-TRANSITORY COMPUTER READABLE MEDIUM STORING PROGRAM FOR READING IMAGE, AND IMAGE READING METHOD FOR ERROR HANDLING

(71) Applicant: FUJIFILM Business Innovation Corp., Tokyo (JP)

(72) Inventor: Yusuke Kamoi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/177,165

(22) Filed: Mar. 2, 2023

(65) Prior Publication Data

US 2024/0056533 A1 Feb. 15, 2024

(30) Foreign Application Priority Data

Aug. 12, 2022 (JP) ................................. 2022-129043

(51) Int. Cl.
*H04N 1/64* (2006.01)
*H04N 1/00* (2006.01)

(52) U.S. Cl.
CPC ..... *H04N 1/00084* (2013.01); *H04N 1/00037* (2013.01); *H04N 1/00074* (2013.01); *H04N 1/00209* (2013.01); *H04N 1/00244* (2013.01); *H04N 2201/0094* (2013.01)

(58) Field of Classification Search
CPC .......... H04N 1/00084; H04N 1/00074; H04N 1/00209; H04N 1/00244
USPC ........................................................ 358/1.14
See application file for complete search history.

(56) References Cited

U.S. PATENT DOCUMENTS 6,647,144 B2 * 11/2003 Williams ............. H04N 1/4072
382/173
8,526,021 B2 9/2013 Takahashi
2010/0231944 A1 9/2010 Takahashi

FOREIGN PATENT DOCUMENTS

JP 2010-219792 A 9/2010
JP 2016174325 A * 9/2016

* cited by examiner

*Primary Examiner* — Jamares Q Washington
(74) *Attorney, Agent, or Firm* — Oliff PLC

(57) ABSTRACT

An image reading apparatus includes a processor configured to: transmit, to an external apparatus, first image data including plural document images obtained by reading plural documents; receive, from the external apparatus, error information on a document image having an error in image processing performed by the external apparatus; and transmit, to the external apparatus, second image data including a document image obtained by performing an addressing process for the error information.

6 Claims, 12 Drawing Sheets

30

32A CPU

32B ROM

32C RAM

32D I/F

36

34A DISPLAY

34B OPERATOR

34C STORAGE

300 IMAGE PROCESSING PROGRAM

302 USER INFORMATION

70

| TITLE | NOTIFICATION OF ERROR INFORMATION |

| To | × × × ×@△△.○○ |

PLEASE CHECK THE FOLLOWING ERROR INFORMATION.

ERROR INFORMATION: A PAGE IS NOT READ PROPERLY.

PLEASE ENTER DOCUMENT ID AND RESCAN DOCUMENT
ON THAT PAGE.

DOCUMENT ID: 22-5
PAGES: PAGE 5 (5/7)

PROCESSED
DOCUMENT IMAGES

ID: 22-7
ID: 22-6
ID: 22-5
ID: 22-4
ID: 22-3
ID: 22-2
ID: 22-1

110

REPLACEMENT

ID: 22-5

120

90

IMAGE READING APPARATUS, NON-TRANSITORY COMPUTER READABLE MEDIUM STORING PROGRAM FOR READING IMAGE, AND IMAGE READING METHOD FOR ERROR HANDLING

CROSS-REFERENCE TO RELATED APPLICATIONS

This application is based on and claims priority under 35 USC 119 from Japanese Patent Application No. 2022-129043 filed Aug. 12, 2022.

BACKGROUND

(i) Technical Field

The present disclosure relates to an image reading apparatus, a non-transitory computer readable medium storing a program for reading an image, and an image reading method.

(ii) Related Art

Japanese Unexamined Patent Application Publication No. 2010-219792 discloses a server that is connected to an image processing apparatus via a network and performs processes in cooperation with the image processing apparatus. The server includes a storage, a transmitter, an execution controller, an acquirer, a flow definer, a UI transmitter, and a controller. The storage stores flow definition information that defines a flow of a process to be performed in cooperation with the image processing apparatus. In response to a processing request from the image processing apparatus, the transmitter determines whether the processing request is made after the occurrence of an error. If the processing request is not made after the occurrence of an error, the transmitter transmits, to the image processing apparatus, UI information for giving an instruction to execute a process based on the stored flow definition information that defines a flow of a process responding to the processing request. The execution controller controls the process to be executed in cooperation of the server and the image processing apparatus based on the flow definition information. In response to reception of a processing request from the image processing apparatus after the occurrence of an error, the acquirer acquires information on an apparatus having the error and the cause of the error. The flow definer defines a flow of a process responding to the processing request after the occurrence of the error based on the acquired information on the apparatus having the error and the cause of the error. The UI transmitter transmits, to the image processing apparatus, UI information for giving an instruction to execute the defined process. The controller controls the defined process to be executed in response to the processing request after the occurrence of the error based on instruction information given by the image processing apparatus based on the UI information.

SUMMARY

Aspects of non-limiting embodiments of the present disclosure relate to an image reading apparatus, a non-transitory computer readable medium storing a program for reading an image, and an image reading method in which image processing is performed by transmitting, to an external apparatus, image data including a plurality of document images obtained by reading a plurality of documents and, if an error has occurred in the image processing on any document image, the document image having the error may be replaced.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading apparatus comprising a processor configured to: transmit, to an external apparatus, first image data including a plurality of document images obtained by reading a plurality of documents; receive, from the external apparatus, error information on a document image having an error in image processing performed by the external apparatus; and transmit, to the external apparatus, second image data including a document image obtained by performing an addressing process for the error information.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described with reference to the drawings.

Figure 1:
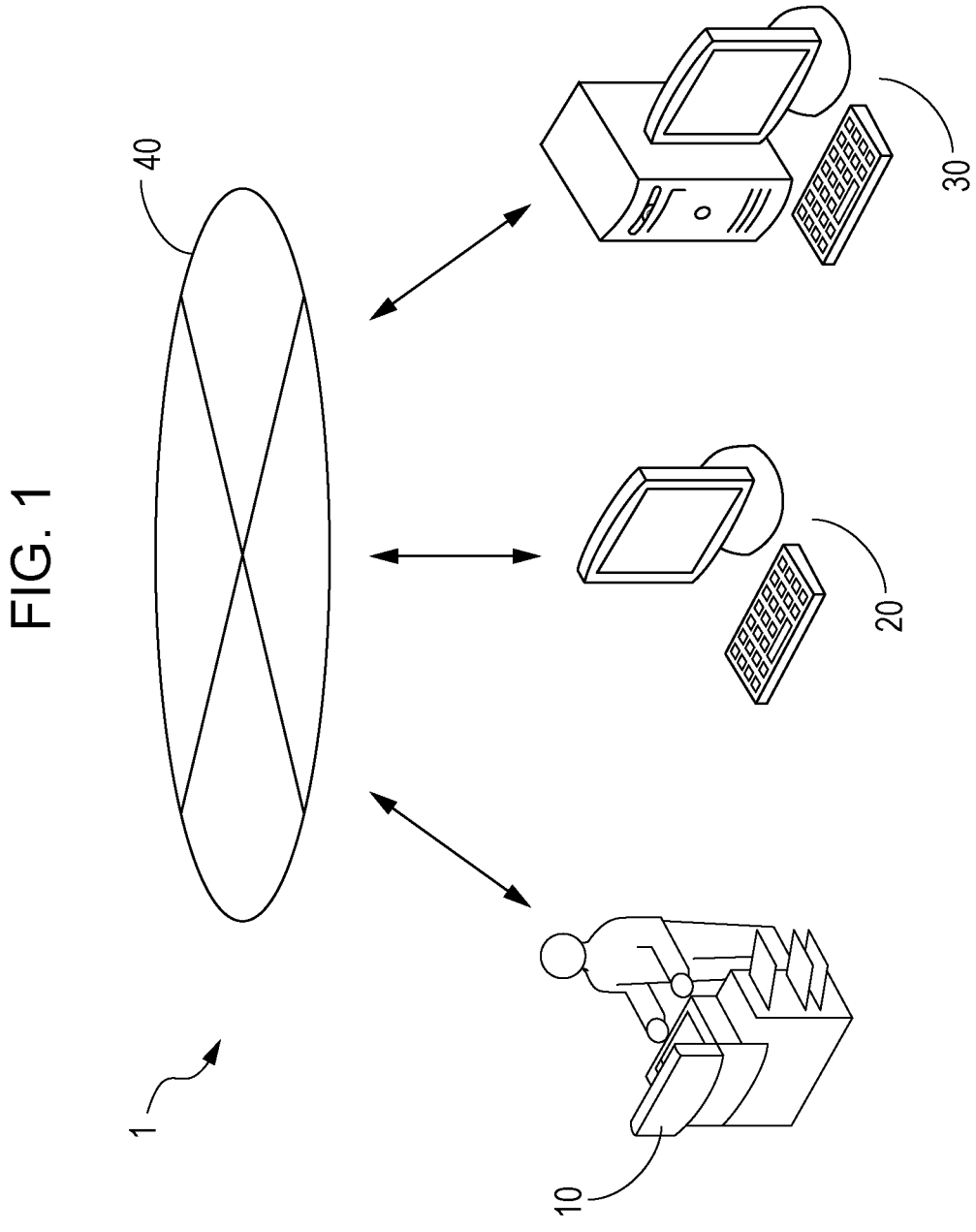
FIG. 1 illustrates an overview of an image processing system according to an exemplary embodiment.

FIG. 1 illustrates an overview of an image processing system 1 according to this exemplary embodiment.

The image processing system 1 includes an image forming apparatus 10, a user apparatus 20, and a processing server 30.

The image forming apparatus 10 has a printing function, a copying function, a scanning function, and a facsimile function. The image forming apparatus 10 includes an image reading apparatus 12 according to this exemplary embodiment (see FIG. 2).

The image reading apparatus 12 generates a document image by reading a document, and transmits image data including the document image to the processing server 30. The processing server 30 is an example of an external apparatus. A plurality of documents may be read. The image reading apparatus 12 that has read a plurality of documents generates document images (page images) of the documents, and transmits image data including the plurality of document images to the processing server 30. The image data including the document image generated from the read document is an example of first image data.

The processing server 30 receives image data from the image reading apparatus 12, and executes a preset process. Examples of the preset process include an optical character reader (OCR) process for generating text data by extracting characters and numerals from a document image in image data, and a translation process for translating text data generated by the OCR process into a specified language.

Examples of the processing server 30 include a general computer.

The user apparatus 20 acquires information from the processing server 30. A user of the image reading apparatus 12 views the acquired information. Examples of the information acquired by the user apparatus 20 from the processing server 30 include an email transmitted from the processing server 30, and details are described later. Examples of the user apparatus 20 include a personal computer and a mobile terminal apparatus. Examples of the mobile terminal apparatus include a smartphone and a tablet terminal.

The image forming apparatus 10, the user apparatus 20, and the processing server 30 are connected to communicate with each other via a network 40 such as the Internet.

Figure 2:
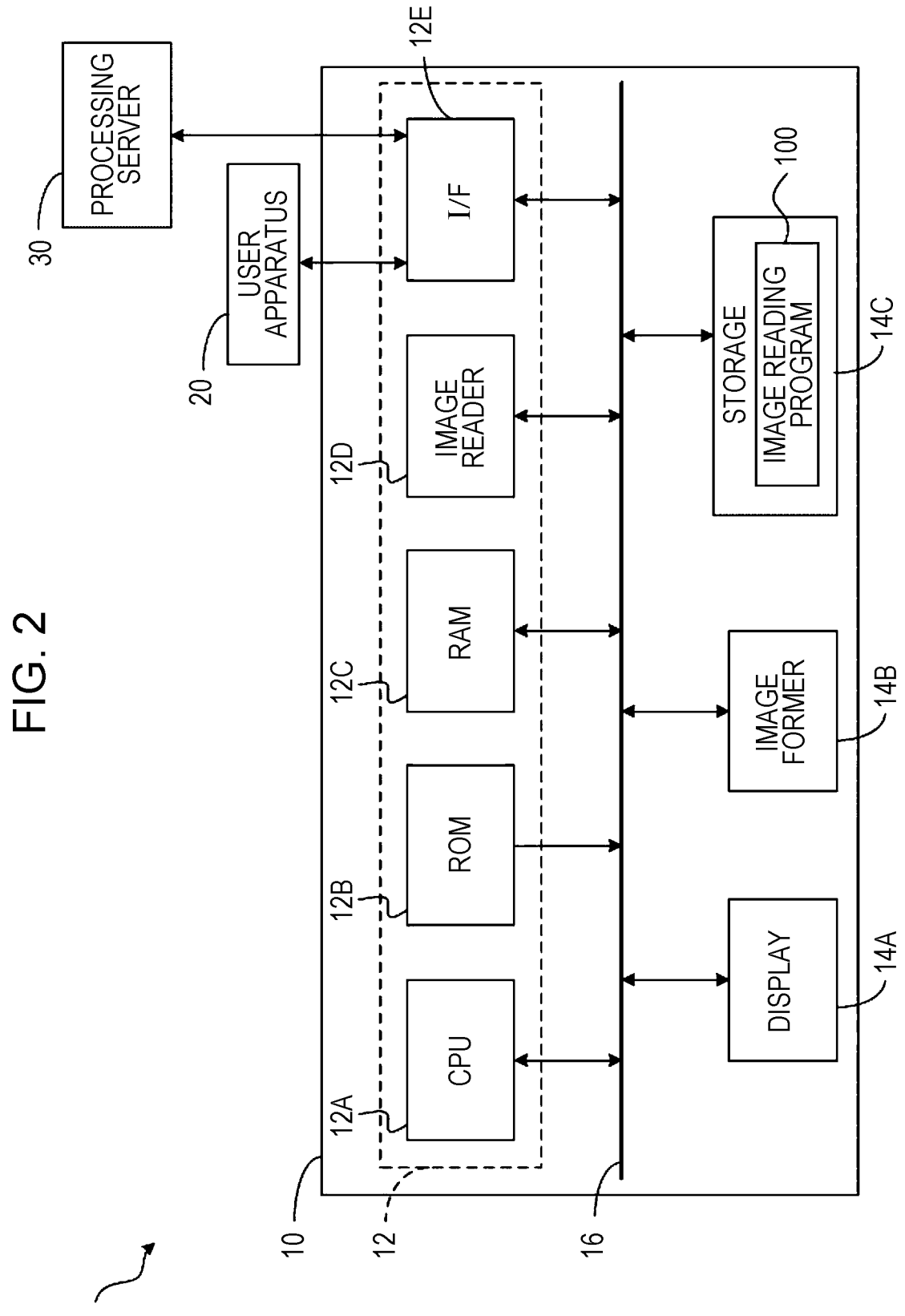
FIG. 2 is a block diagram illustrating an example of the configuration of an image forming apparatus.

FIG. 2 is a block diagram illustrating an example of the configuration of the image forming apparatus 10. The image forming apparatus 10 includes the image reading apparatus 12 according to this exemplary embodiment, a display 14A, an image former 14B, and a storage 14C.

For example, the image reading apparatus 12 includes a central processing unit (CPU) 12A, a read only memory (ROM) 12B, a random access memory (RAM) 12C, an image reader 12D, and a communication interface (I/F) 12E.

The CPU 12A reads an image reading program 100 from the storage 14C. Details of the image reading program 100 are described later.

The CPU 12A executes the read program by using the RAM 12C as a working area to control the image reading apparatus 12 and the image forming apparatus 10. The CPU 12A is an example of a processor.

The image reader 12D includes, for example, a charge-coupled device (CCD) image sensor that reads a set document and generates a document image.

The I/F 12E is an interface for communicating with an external apparatus or the like by using standards such as Ethernet (registered trademark) and Wi-Fi (registered trademark). In the example illustrated in FIG. 2, the OF 12E is connected to communicate with the user apparatus 20 and the processing server 30.

The display 14A is a touch panel including, for example, a liquid crystal display or an organic EL display. The display 14A displays various operation screens and receives user's touch operations.

For example, the image former 14B includes a photoconductor and forms an image on a recording medium by using a so-called electrophotographic system based on a document read by the image reader 12D.

Examples of the storage 14C include a solid state drive (SSD) and a hard disk drive (HDD). The storage 14C is an example of a memory.

The image reading apparatus 12, the display 14A, the image former 14B, and the storage 14C are connected to communicate with each other via a bus 16.

The configurations of the user apparatus 20 and the processing server 30 are described. The configuration of the processing server 30 is described below. Since the user apparatus 20 is a general computer similarly to the processing server 30, description thereof is omitted.

Figure 3:
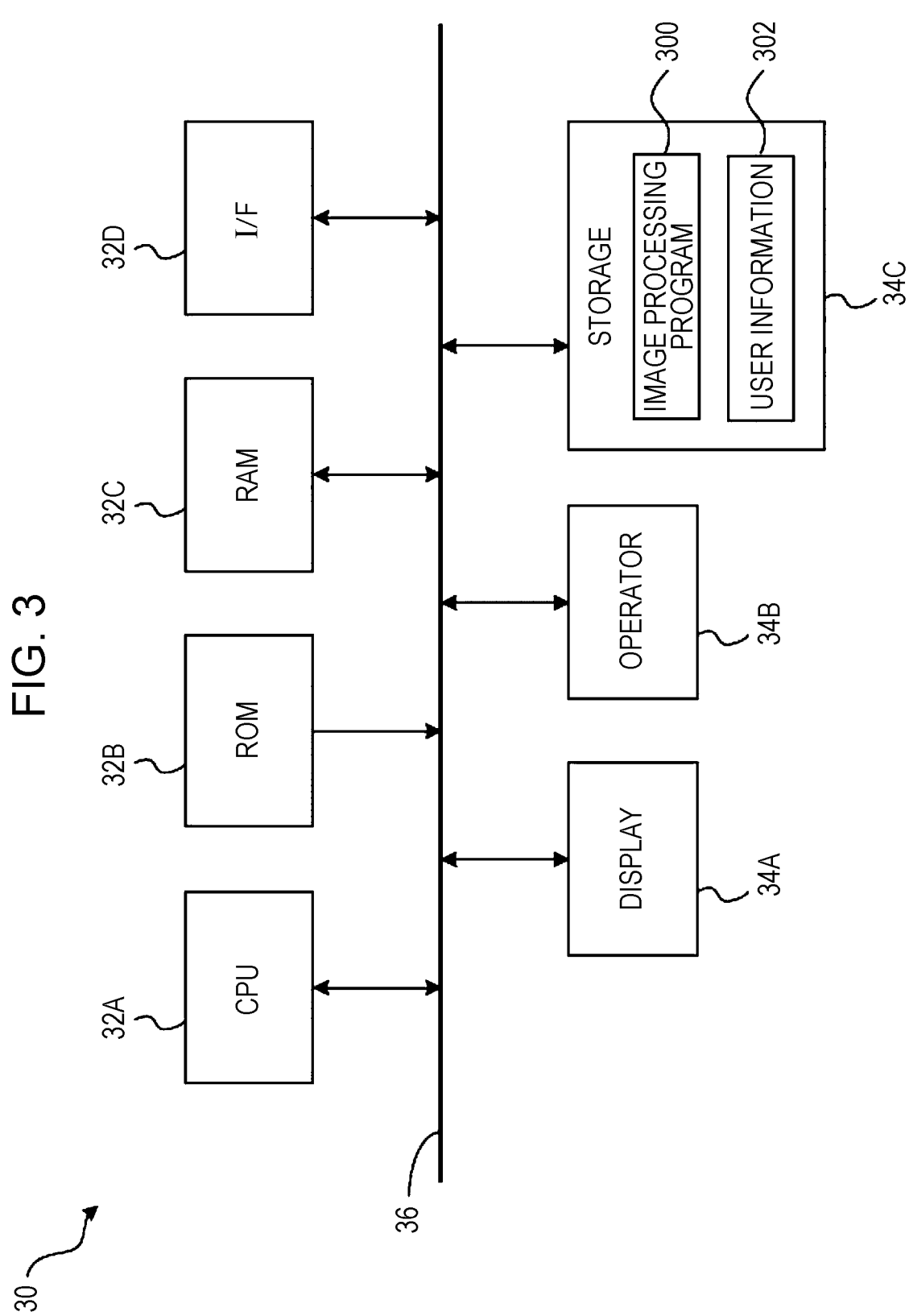
FIG. 3 is a block diagram illustrating an example of the configuration of a processing server.

FIG. 3 is a block diagram illustrating an example of the configuration of the processing server 30.

For example, the processing server 30 includes a CPU 32A, a ROM 32B, a RAM 32C, a communication interface (I/F) 32D, a display 34A, an operator 34B, and a storage 34C.

The CPU 32A reads an image processing program 300 and various other programs from the storage 34C. Details of the image processing program 300 are described later.

The CPU 32A executes the read programs by using the RAM 32C as a working area to control the processing server 30. The CPU 32A is an example of a processor of the processing server 30.

The I/F 32D is an interface for communicating with an external apparatus or the like by using standards such as Ethernet (registered trademark) and Wi-Fi (registered trademark). The I/F 32D is connected to communicate with the image reading apparatus 12 and the user apparatus 20.

The display 34A is an interface between the processing server 30 and a user. Examples of the display 34A include a liquid crystal display and an organic EL display.

Examples of the operator 34B include a mouse and a keyboard.

For example, the storage 34C stores the image processing program 300, user information 302, and various other programs. Examples of the storage 34C include a solid state drive (SSD) and a hard disk drive (HDD). The storage 34C is an example of a storage. The user information 302 is information on users of the image forming apparatus 10. Examples of the user information 302 include table data indicating correspondence between user IDs for identifying users and email addresses of the users.

The CPU 32A, the ROM 32B, the RAM 32C, the communication interface (I/F) 32D, the display 34A, the operator 34B, and the storage 34C are connected to communicate with each other via a bus 36.

Processes of the image reading program to be executed by the CPU 12A of the image reading apparatus 12 are described with reference to FIGS. 4 to 8.

Figure 4:
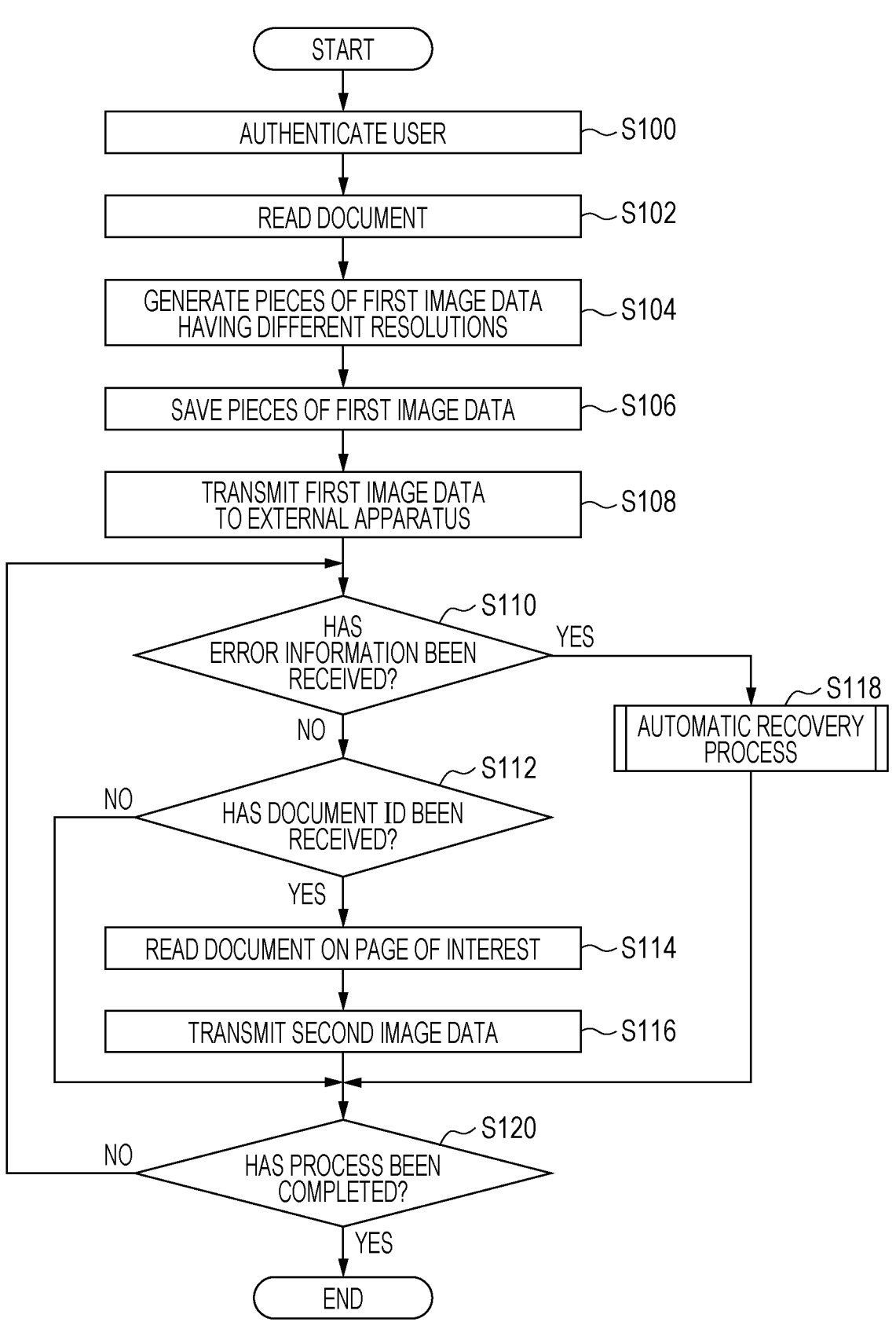
FIG. 4 is a flowchart illustrating a flow of an image reading process to be performed by an image reading apparatus.

FIG. 4 is a flowchart illustrating a flow of an image reading process to be performed by the image reading apparatus 12. The image reading apparatus 12 performs processes illustrated in FIGS. 4 and 5 by executing the image reading program 100.

For example, the image reading program 100 is executed by the CPU 12A when the user instructs, on the image reading apparatus 12, the processing server 30 to execute image processing.

In Step S100, the CPU 12A receives a user's login operation and executes a user authentication process. For example, the user logs in by using an IC card of the user. The IC card prestores user identification (ID). When the user ID is read from the IC card, the user ID is transmitted to the processing server 30. The processing server 30 verifies the user ID transmitted from the image forming apparatus 10 against the user information 302, and transmits, to the image forming apparatus 10, a result of authentication as to whether the user is allowed to use the image forming apparatus 10. If the login user is allowed to use the image forming apparatus 10 based on the authentication result, the CPU 12A proceeds to Step S102. If the user is not allowed, the display 14A displays information indicating that the user is not allowed.

In Step S102, the CPU 12A causes the image reader 12D to read a document set by the user. A plurality of documents may be read. When reading the document, the resolution is set to the highest resolution among the settable resolutions. In a case where three types of resolution such as 150 dots per inch (dpi), 300 dpi, and 450 dpi are settable, the highest resolution 450 dpi (high resolution) is set.

In Step S104, the CPU 12A generates a plurality of pieces of first image data having different resolutions for the document read in Step S102.

Specifically, pieces of first image data having 300 dpi (medium resolution) and 150 dpi (low resolution) are generated by using the document read in Step S102. Thus, pieces of first image data having three types of resolution that are the high resolution, the medium resolution, and the low resolution are generated by reading the document once. The CPU 12A assigns document IDs to the generated document images. The document ID is an example of an identification code. Examples of the document ID include a combination of an identification code for identifying the document and an identification code for identifying a page number of the document image. For example, an identification code "22" is assigned to identify a document having 7 pages, and document IDs "22-1" to "22-7" are assigned to document images of individual pages of the document. The same document ID is assigned to document images generated from the same document and having different resolutions. The method for assigning the identification codes is not limited to the above example.

In Step S106, the CPU 12A saves, in the storage 14C, the plurality of pieces of first image data generated in Step S104 and having different resolutions, for example, until the processing server 30 completes the image processing.

In Step S108, the CPU 12A transmits, to the processing server 30, for example, the first image data including the document image having the medium resolution among the plurality of pieces of generated first image data having different resolutions. If the document has a plurality of pages, a plurality of document images in the first image data has medium resolutions of individual pages.

In Step S110, the CPU 12A determines whether error information is received from the processing server 30. The error information includes details of an error that has occurred when the processing server 30 executes the image processing on a document image in the first image data, and a document ID of the document image having the error. Examples of the details of the error include an error based on an insufficient resolution of a document image, an error based on the size of the first image data, an error based on influence of show-through of a document image, and an error based on influence of a ground color of a document image.

Figure 5:
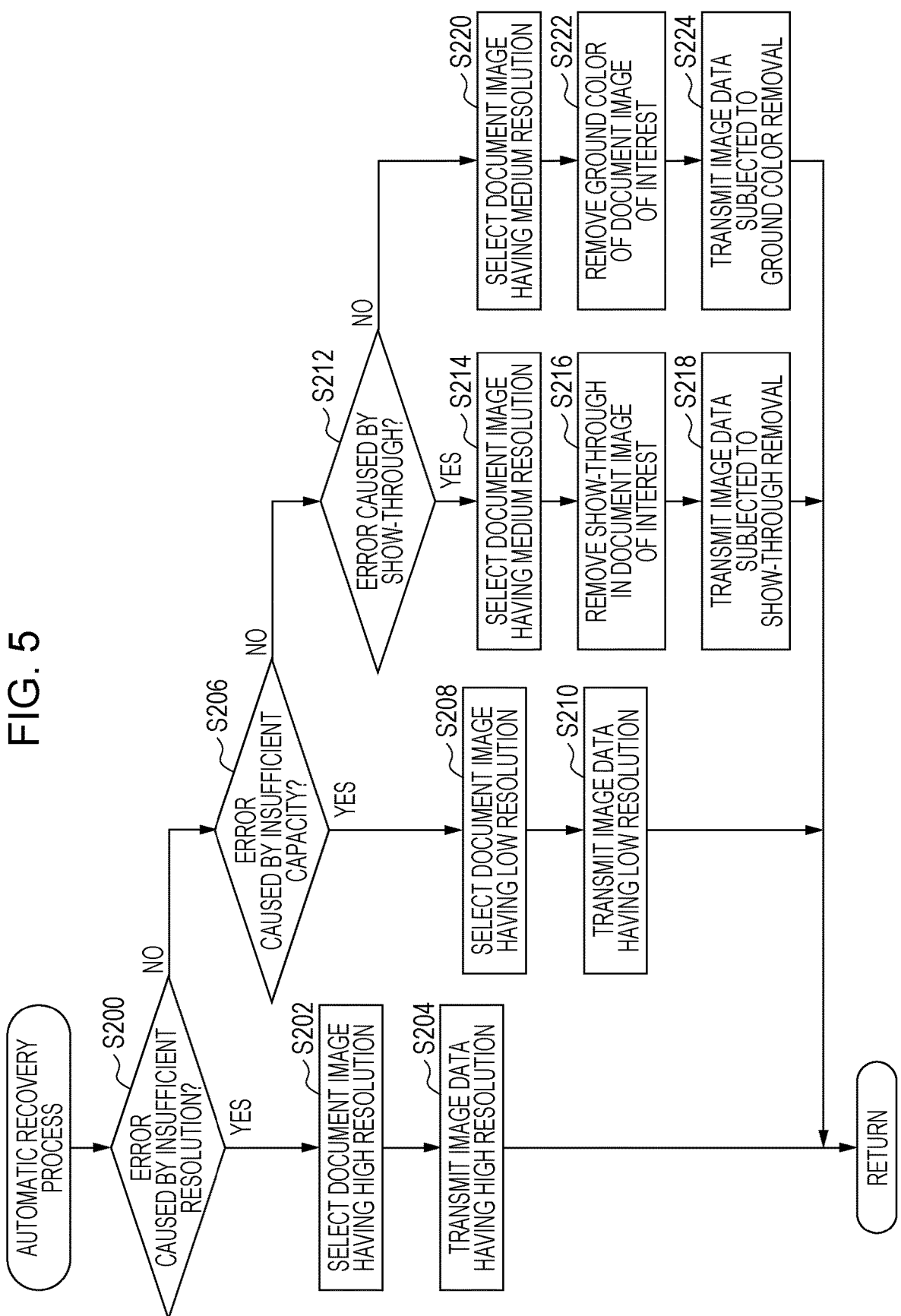
FIG. 5 is a flowchart illustrating an automatic recovery process.

If the error information is received from the processing server 30 (Step S110: YES), the CPU 12A performs an automatic recovery process illustrated in FIG. 5. Details of the automatic recovery process illustrated in FIG. 5 are described later.

If the error information is not received from the processing server 30 (Step S110: NO), the CPU 12A determines, in Step S112, whether an input of a document ID by user's operation is received. Specifically, the CPU 12A determines whether a document ID is specified by user's operation on the display 14A.

Errors that may occur during the image processing performed by the processing server 30 include an error for which automatic recovery is possible without the need for the user to perform document reading again, and an error for which automatic recovery is not possible, that is, manual recovery is necessary with the need for the user to perform document reading again. Examples of the error for which automatic recovery is possible include an error based on an insufficient resolution of a document image, an error based on the size of the first image data, an error based on influence of show-through of a document image, and an error based on influence of a ground color of a document image. The error for which manual recovery is necessary is an error other than the error for which automatic recovery is possible. Examples of the error include read image distortion at the time of reading a document. In response to the occurrence of the error for which manual recovery is necessary, an email 70 illustrated in FIG. 6 is transmitted from the processing server 30 to the user apparatus 20.

Figure 6:
FIG. 6 illustrates an example of an email transmitted from the processing server.

For example, the email 70 illustrated in FIG. 6 includes a message that prompts the user to perform document reading again for a document image having an error, a document ID associated with the document image having the error, and a page number corresponding to the document image having the error. Thus, the user recognizes the document to be read again. In the example of FIG. 6, the user recognizes that document reading is necessary again for page 5, sets the document of page 5 on the image forming apparatus 10, and instructs the image forming apparatus 10 to read the document. The user's instruction to read the document again is an example of an addressing process for the error information.

In Step S112 of FIG. 4, the CPU 12A determines whether a document ID is received by operation of the user who has received the email 70. If the document ID is received (Step S112: YES), the CPU 12A proceeds to Step S114. If no document ID is received (Step S112: NO), the CPU 12A proceeds to Step S120.

In Step S114, the CPU 12A causes the image reader 12D to read the document set again by the user.

In Step S116, the CPU 12A transmits, to the processing server 30, second image data including a document image generated by reading the document set again by the user and the document ID received in Step S112.

The process of Steps S114 and S116 is referred to as "manual recovery process". That is, the manual recovery process is executed by the CPU 12A if error information on an error for which automatic recovery is possible is not received and a document ID is received from the user.

In Step S120, the CPU 12A determines whether a process completion notification is sent from the processing server 30. If the process completion notification is sent from the processing server 30 (Step S120: YES), the CPU 12A terminates this routine. If the process completion notification is not sent from the processing server 30 (Step S120: NO), the CPU 12A proceeds to Step S110.

The automatic recovery process to be executed in Step S118 is described with reference to FIG. 5.

In Step S200, the CPU 12A determines whether details of the error in the error information received in Step S110 of FIG. 4 indicate an error caused by an insufficient resolution of a document image.

For example, an error is caused by an insufficient resolution when the processing server 30 is executing image processing for extracting texts from a document image in the first image data but fails to extract the texts due to the insufficient resolution of the document image.

If the error is caused by the insufficient resolution (Step S200: YES), the CPU 12A selects, in Step S202, a document image having a resolution associated with the error information from among the acquired document images having different resolutions. Specifically, the CPU 12A selects the document image having the high resolution from among the acquired document images having different resolutions. The process of selecting the document image having the high resolution is an example of the addressing process for the error information.

In Step S204, the CPU 12A transmits image data including the document image having the high resolution to the processing server 30. The image data including the document image having the high resolution is an example of the second image data.

If the error is not caused by the insufficient resolution (Step S200: NO), the CPU 12A determines, in Step S206, whether the details of the error in the error information indicate an error caused by an insufficient capacity for the image data.

For example, an error is caused by an insufficient capacity when the size of the first image data subjected to the image processing by the processing server 30 is larger than the capacity of the storage 34C expected to store the image data subjected to the image processing. More specifically, the size of the first image data including a document image including texts and pictures and subjected to the image processing may be larger than the capacity of the storage 34C expected to store the first image data subjected to the image processing. Further, an error may be caused by an insufficient capacity when the size of the first image data is larger than the capacity of the RAM 32C necessary for execution of the image processing. More specifically, if the first image data including a document image including texts and pictures has high resolutions of the pictures or the like, the size of the first image data may be larger than the capacity of the RAM 32C necessary for execution of the image processing.

If the error is caused by the insufficient capacity (Step S206: YES), the CPU 12A selects, in Step S208, a document image having a resolution associated with the error information from among the acquired document images having different resolutions. Specifically, the CPU 12A selects the document image having the low resolution from among the acquired document images having different resolutions. The process of selecting the document image having the low resolution is an example of the addressing process for the error information.

In Step S210, the CPU 12A transmits image data including the document image having the low resolution to the processing server 30. The image data including the document image having the low resolution is an example of the second image data.

If the error is not caused by the insufficient capacity (Step S206: NO), the CPU 12A determines, in Step S212, whether the details of the error indicate an error caused by show-through of a document image.

If the error is caused by the show-through of the document image (Step S212: YES), the CPU 12A selects, in Step S214, for example, the document image having the medium resolution from among the acquired document images having different resolutions.

In Step S216, the CPU 12A executes a show-through removal process on the document image having the medium resolution. Specifically, the show-through removal process is image processing for reducing the density of the document image, and various known methods may be used.

Figure 7:
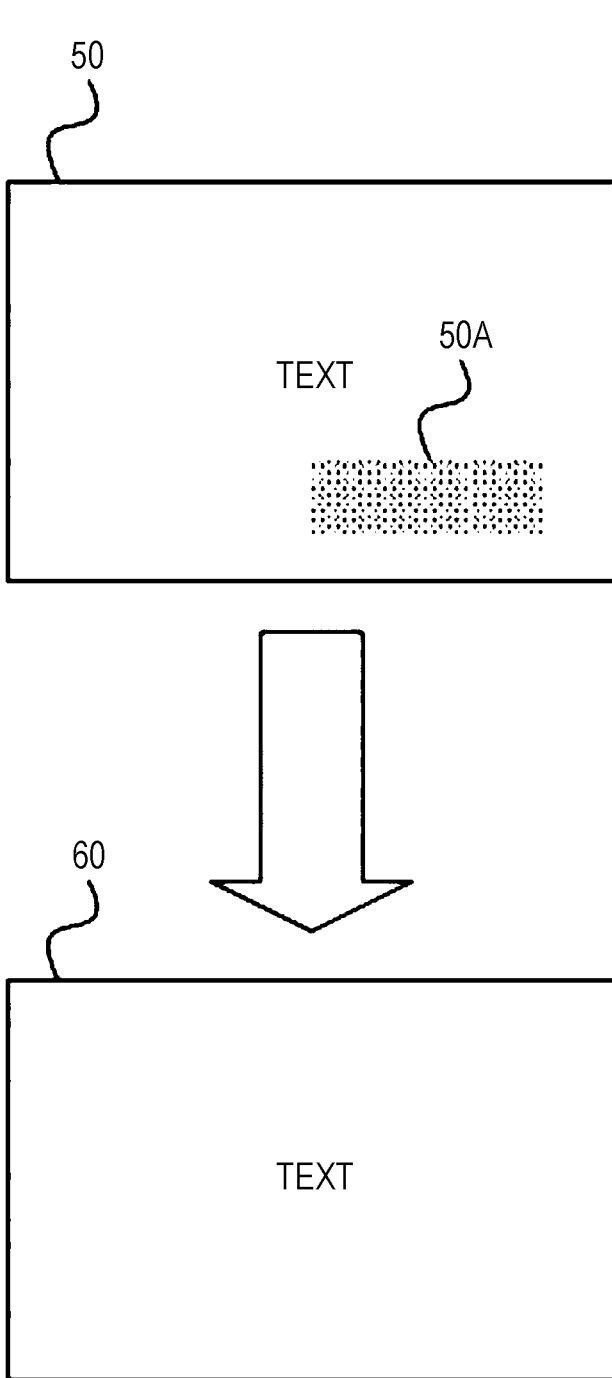
FIG. 7 illustrates an overview of a show-through removal process.

FIG. 7 illustrates an overview of the show-through removal process. FIG. 7 illustrates a document image 50 having an error caused by show-through in the image processing on the first image data. The document image 50 has show-through 50A due to, for example, a blot on the back surface of the read document. The show-through 50A may adversely affect the image processing. For example, the CPU 12A makes adjustment to reduce the density of the document image 50 to generate a document image 60 from which the show-through 50A is removed. The process of removing the show-through 50A is an example of the addressing process for the error information.

In Step S218, the CPU 12A transmits, to the processing server 30, image data including the document image 60 from which the show-through 50A is removed. The image data including the document image 60 from which the show-through 50A is removed is an example of the second image data.

If the error is not caused by the show-through (Step S212: NO), the CPU 12A selects, in Step S220, for example, the document image having the medium resolution from among the acquired document images having different resolutions.

In Step S222, the CPU 12A executes a ground color removal process on the document image having the medium resolution. Various known methods may be used for the ground color removal process.

Figure 8:
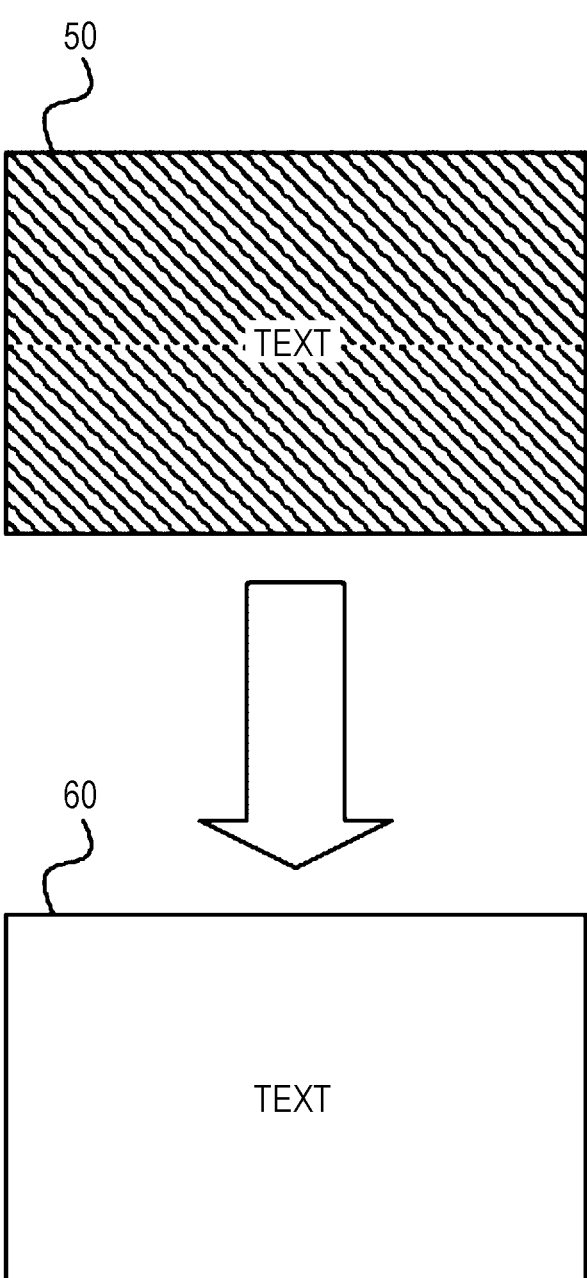
FIG. 8 illustrates an overview of a ground color removal process.

FIG. 8 illustrates an overview of the ground color removal process. FIG. 8 illustrates a document image 50 having an error caused in the image processing on the first image data. The document image 50 may adversely affect the image processing because the read document has a ground color other than white. For example, the CPU 12A adjusts the transparency of the document image 50 to generate a document image 60 from which the ground color is removed. The ground color removal process is an example of the addressing process for the error information.

In Step S224, the CPU 12A transmits, to the processing server 30, image data including the document image 60 from which the ground color is removed. The image data including the document image 60 from which the ground color is removed is an example of the second image data.

The CPU 12A proceeds to Step S120 of FIG. 4 after the process of Step S204, S210, S218, or S224 has been performed.

The image processing to be executed by the processing server 30 is described with reference to FIGS. 9 to 12.

Figure 9:
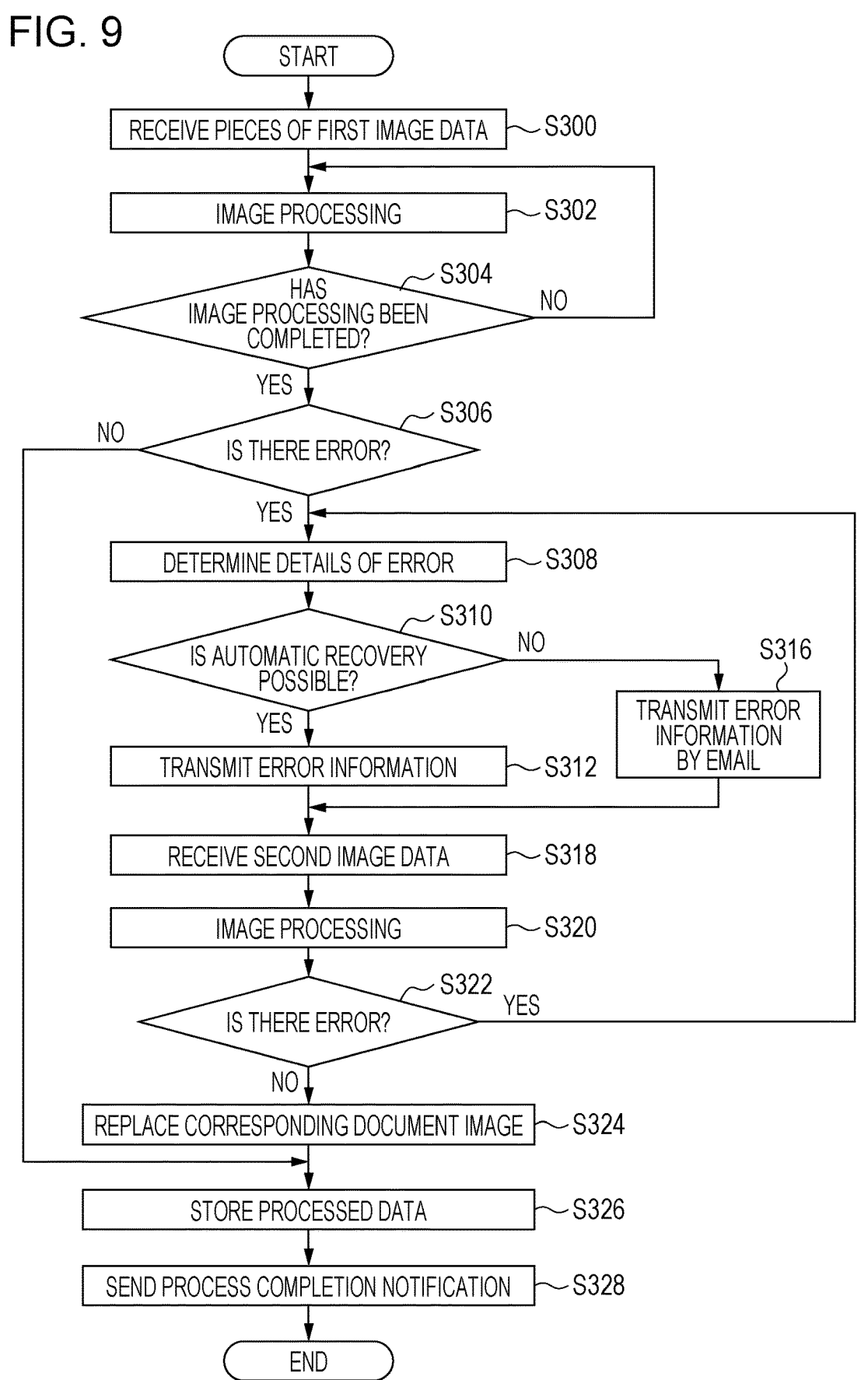
FIG. 9 is a flowchart illustrating an example of an operation of an image processing program to be executed by the processing server.

FIG. 9 is a flowchart illustrating an example of an operation of the image processing program 300 to be executed by the processing server 30. The process illustrated in FIG. 9 is executed when the user allowed to use the image forming apparatus 10 by the user authentication process (not illustrated) performs document reading on the image forming apparatus 10.

In Step S300, the CPU 32A receives pieces of first image data from the image reading apparatus 12.

In Step S302, the CPU 32A executes image processing such as the OCR process on document images in the received pieces of first image data.

In Step S304, the CPU 32A determines whether the image processing has been executed on document images of all pages in the pieces of first image data.

If any document image in the pieces of first image data is not subjected to the image processing (Step S304: NO), the process of Step S302 is executed on the document image that is not subjected to the image processing.

If all the document images in the pieces of first image data are subjected to the image processing, the image processing on the pieces of first image data is finished (Step S304: YES). In Step S306, the CPU 32A determines whether any document image has an error in the image processing.

If no document image has an error in the image processing (Step S306: NO), the CPU 32A executes a process of Step S326 onward.

If any document image has an error (Step S306: YES), the CPU 32A determines details of the error in Step S308. For example, the details of the error are classified into an error caused by an insufficient resolution of a document image, an error caused by the size of the first image data, an error caused by the size of the first image data subjected to the image processing, an error caused by show-through of a document image, an error caused by a ground color of a document image, and errors caused by other reasons. For example, the CPU 12A determines the details of the error based on this classification.

In Step S310, the CPU 32A determines whether the details of the error indicate an error for which automatic recovery is possible by the image reading apparatus 12.

For example, the CPU 32A determines that the automatic recovery is possible if the error is caused by an insufficient resolution of a document image, an insufficient capacity for the first image data, an insufficient capacity for the first image data subjected to the image processing, show-through of a document image, or a ground color of a document image.

If the automatic recovery is possible (Step S310: YES), the CPU 32A transmits error information to the image reading apparatus 12 in Step S312. The error information includes the details of the error and a document ID of the document image having the error.

If the automatic recovery is not possible (Step S310: NO), the CPU 32A transmits, in Step S316, to an email address of the user who has performed the document reading, the email 70 of FIG. 6 including the error information and the message that prompts the user to perform again the reading of the document corresponding to the document image having the error. Specifically, the CPU 32A refers to the user information 302 to acquire an email address associated with a user ID obtained by user authentication in advance, and transmits the email 70 to the acquired email address.

Figure 10:
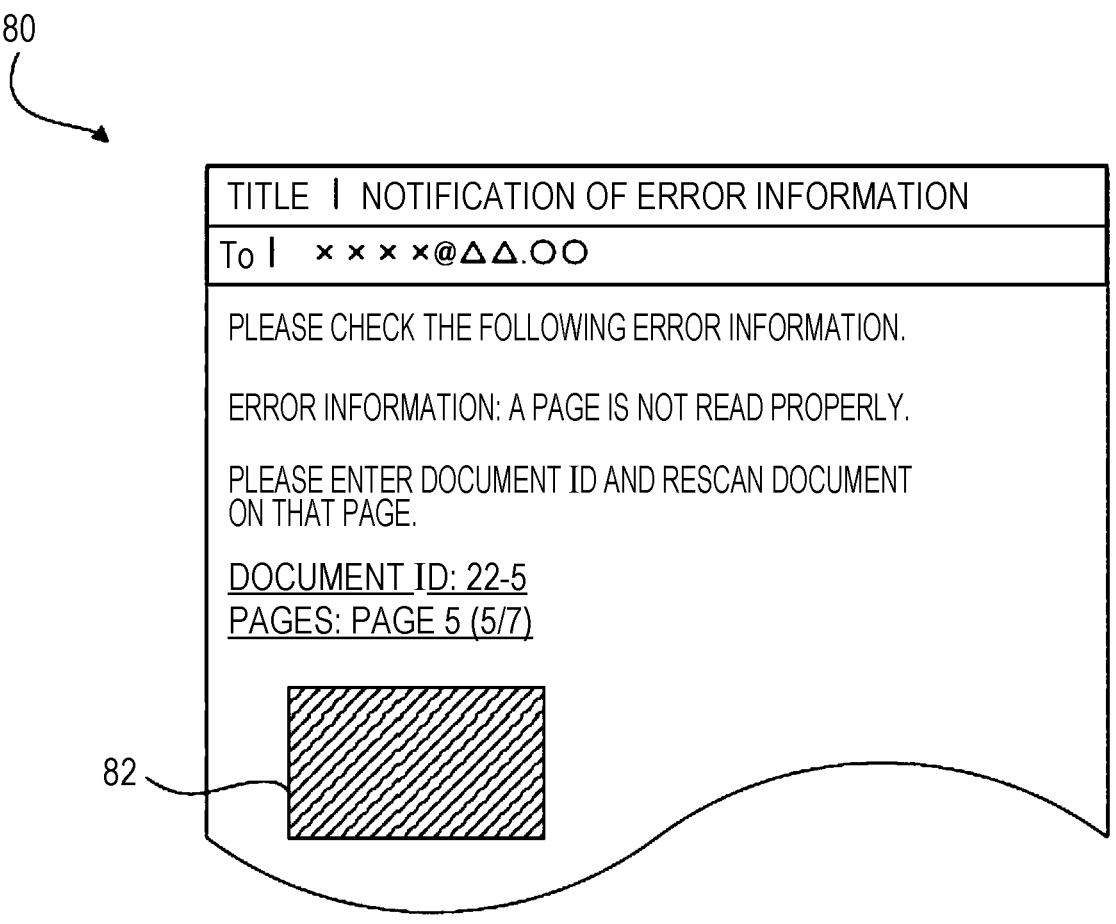
FIG. 10 illustrates another example of the email transmitted from the processing server.

As illustrated in FIG. 10, an email 80 including an image 82 representing the document image having the error in addition to the error information and the message that prompts the user to perform again the reading of the document corresponding to the document image having the error may be transmitted to the user apparatus 20.

In Step S318 of FIG. 9, the CPU 32A receives, from the image reading apparatus 12, second image data including a document image having the same document ID as the document ID of the document image having the error, that is, second image data including a document image obtained by performing the addressing process on the document image having the error. Specifically, the CPU 32A receives the second image data when the image reading apparatus 12 executes the automatic recovery process or the manual recovery process.

In Step S320, the CPU 32A executes image processing similar to that in Step S302 on the document image in the received second image data.

In Step S322, the CPU 32A determines whether any document image has an error in the image processing on the document image in the second image data.

If any document image has an error (Step S322: YES), the CPU 32A repeats the process of Steps S308 to S322.

If no document image has an error (Step S322: NO), the CPU 32A replaces, in Step S324, the document image having the error in the pieces of first image data with the document image subjected to the image processing in the second image data. Details are described with reference to FIG. 11.

Figure 11:
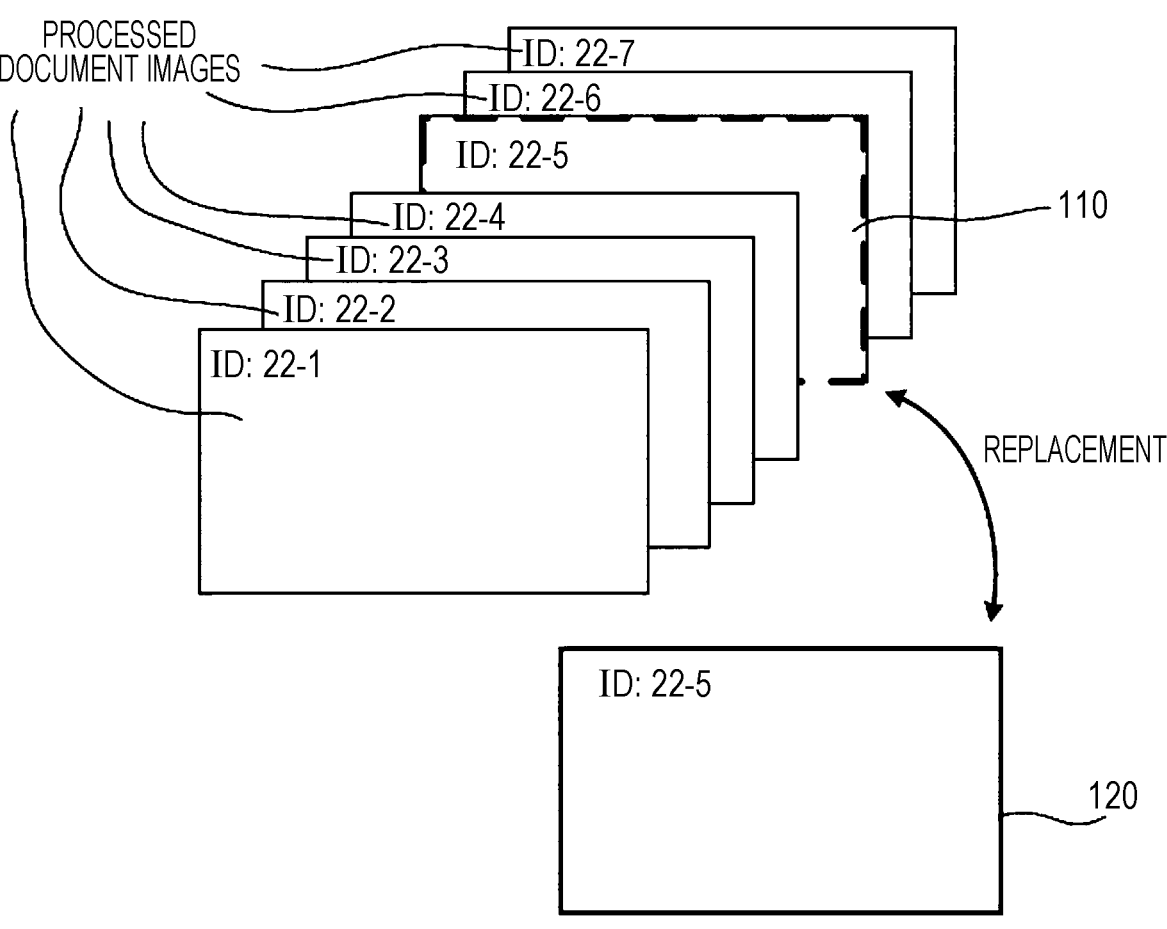
FIG. 11 illustrates document image replacement.

In FIG. 11, a document image 110 having a document ID "22-5" is included in the first image data and has an error in the image processing. In FIG. 11, processed document images other than the document image 110 are document images included in the first image data and having no error in the image processing. For example, the processed document images are stored in the storage 34C. A document image 120 having a document ID "22-5" is included in the second image data and subjected to the image processing. The CPU 32A replaces the document image 110 included in the first image data and having the error with the document image 120 included in the second image data and subjected to the image processing.

In Step S326 of FIG. 9, the CPU 32A stores, for example, in the storage 34C, the first image data including the document images subjected to the image processing without an error. The first image data including the document images subjected to the image processing without an error is an example of processed image data.

In Step S328, the CPU 32A notifies the image forming apparatus 10 that the processed image data has been stored, for example, in the storage 34C and the process has been completed, and transmits, to the user apparatus 20, an email for notifying the user that the process has been completed. Thus, the CPU 32A terminates the process performed based on the image processing program 300.

Figure 12:
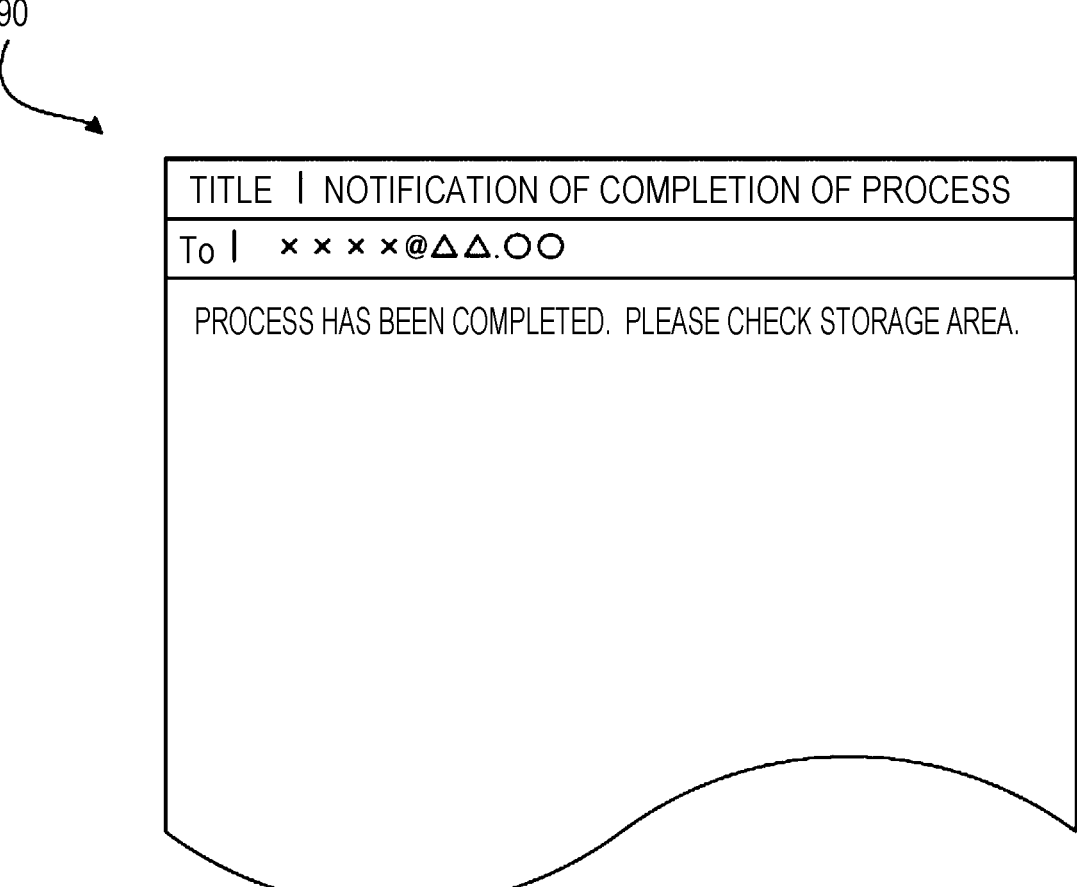
FIG. 12 illustrates an example of a notification email indicating that processed data has been stored in a storage.

FIG. 12 illustrates an example of the notification email indicating that the processed data has been stored in the storage 34C. An email 90 illustrated in FIG. 12 is transmitted to the user apparatus 20 by the processing server 30 when the processed image data is stored in the storage 34C. The user views the email 90 and accesses, for example, the storage 34C to acquire the processed image data.

In this exemplary embodiment, both the automatic recovery and the manual recovery are executed, but either one of the automatic recovery and the manual recovery may be executed. Further, the automatic recovery and the manual recovery may be switched, or whether to execute the automatic recovery or the manual recovery may be set.

The exemplary embodiment is not intended to limit the disclosure of the claims, and all the combinations of the features described in the exemplary embodiment are not requisites. The exemplary embodiment has various features that are extracted by any combination of the plurality of constituent elements disclosed herein. Any constituent element may be omitted from the constituent elements described in the exemplary embodiment.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In this exemplary embodiment, the image reading program 100 is installed in the storage 14C, but this configuration is not limitative. In this exemplary embodiment, the image processing program 300 is installed in the ROM 32B or the storage 34C, but this configuration is not limitative. The image reading program 100 and the image processing program 300 according to this exemplary embodiment may be provided by being recorded in a computer readable storage medium. For example, the image reading program 100 and the image processing program 300 according to this exemplary embodiment may be provided by being recorded in an optical disc such as a compact disc (CD)-ROM or a digital versatile disc (DVD)-ROM, or in a semiconductor memory such as a universal serial bus (USB) memory or a memory card. The image reading program 100 according to this exemplary embodiment may b e acquired from an external apparatus via the OF 12E. The image processing program 300 according to this exemplary embodiment may be acquired from an external apparatus via the OF 32D.

In the exemplary embodiment described above, the processes in the image reading and the processes in the image processing are realized by the software configuration using the computers through the execution of the programs, but this configuration is not limitative. For example, the information processes may be realized by a hardware configuration or a combination of the hardware configuration and the software configuration.

The configuration of the image reading apparatus 12 described in the exemplary embodiment is illustrative, and any part may be omitted or a new part may be added without departing from the gist of the exemplary embodiment of the present disclosure.

The configurations of the user apparatus 20 and the processing server 30 described in the exemplary embodiment are illustrative, and any part may be omitted or a new part may be added without departing from the gist of the exemplary embodiment of the present disclosure.

The flows of the processes of the image reading program 100 (see FIGS. 4 and 5) and the flow of the process of the image processing program 300 (see FIG. 9) in the exemplary embodiment are illustrative, and any step may be omitted, a new step may be added, or the processing order may be changed without departing from the gist of the exemplary embodiment of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading apparatus comprising:
a processor programmed to:
   transmit, to an external apparatus, first image data including a plurality of document images obtained by reading one or more documents;

store, in a memory, the first image data until the external apparatus completes processing of the first image data;
   receive, from the external apparatus, error information on a document image having an error in image processing performed by the external apparatus;
   determine, based on the received error information, whether the error is automatically recoverable;
   in response to determining that the error is not automatically recoverable: (i) receive an identification code associated with the document image having the error from a user who has received the identification code and a message that prompts the user to perform a re-reading of a document corresponding to the document image having the error, and (ii) transmit, to the external apparatus, second image data including the identification code and the document image obtained from the re-reading of the document; and
   in response to determining that the error is automatically recoverable: (i) perform, without additional user operation, an addressing process on the document image having the error and stored in the memory, and (ii) transmit, to the external apparatus, second image data including the document image obtained from the performing of the addressing process.

2. The image reading apparatus according to claim 1, wherein the image processing includes a process of extracting text data from the plurality of document images, and
wherein the addressing process is at least one of a process of removing show-through of the document associated with the error information or a process of removing a ground color of the document associated with the error information.

3. The image reading apparatus according to claim 1, wherein the processor is programmed to generate the plurality of document images having different resolutions,
wherein the image processing includes a process of extracting text data from the plurality of document images, and
wherein the addressing process includes a process of selecting a document image having a resolution associated with the error information from among the plurality of document images having different resolutions and associated with the error information.

4. A non-transitory computer readable medium storing a program causing a computer to execute a process for reading an image, the process comprising:
transmitting, to an external apparatus, first image data including a plurality of document images obtained by reading one or more documents;
storing, in a memory, the first image data until the external apparatus completes processing of the first image data;
receiving, from the external apparatus, error information on a document image having an error in image processing performed by the external apparatus;
determining, based on the received error information, whether the error is automatically recoverable;
in response to determining that the error is not automatically recoverable: (i) receiving an identification code associated with the document image having the error from a user who has received the identification code and a message that prompts the user to perform a re-reading of a document corresponding to the document image having the error, and (ii) transmitting, to the external apparatus, second image data including the identification code and the document image obtained from the re-reading of the document; and in response to determining that the error is automatically recoverable: (i) performing, without additional user operation, an addressing process on the document image having the error and stored in the memory, and (ii) transmitting, to the external apparatus, second image data including the document image obtained from the performing of the addressing process.

5. An image reading method comprising:

transmitting, to an external apparatus, first image data including a plurality of document images obtained by reading one or more documents;

storing, in a memory, the first image data until the external apparatus completes processing of the first image data;

receiving, from the external apparatus, error information on a document image having an error in image processing performed by the external apparatus;

determining, based on the received error information, whether the error is automatically recoverable;

in response to determining that the error is not automatically recoverable: (i) receiving an identification code associated with the document image having the error from a user who has received the identification code and a message that prompts the user to perform a re-reading of a document corresponding to the document image having the error, and (ii) transmitting, to the external apparatus, second image data including the identification code and the document image obtained from the re-reading of the document; and in response to determining that the error is automatically recoverable: (i) performing, without additional user operation, an addressing process on the document image having the error and stored in the memory, and (ii) transmitting, to the external apparatus, second image data including the document image obtained from the performing of the addressing process.

6. An image reading apparatus comprising:

a processor programmed to:

transmit, to an external apparatus, first image data including a plurality of document images obtained by reading one or more documents, wherein the plurality of document images have different resolutions and are generated from reading a document once;

store, in a memory, the first image data until the external apparatus completes processing of the first image data;

receive, from the external apparatus, error information on a document image having an error in image processing performed by the external apparatus; and transmit, to the external apparatus, second image data including a document image obtained by performing an addressing process for the error information, wherein the addressing process is a process of selecting a document image having a resolution associated with the error information from among the plurality of document images having different resolutions and associated with the error information.

\* \* \* \* \*